July 25, 1961 A. W. BROWN ET AL 2,993,235
METHOD FOR MAKING REINFORCED RESIN PRODUCTS
Filed March 4, 1957 4 Sheets-Sheet 1
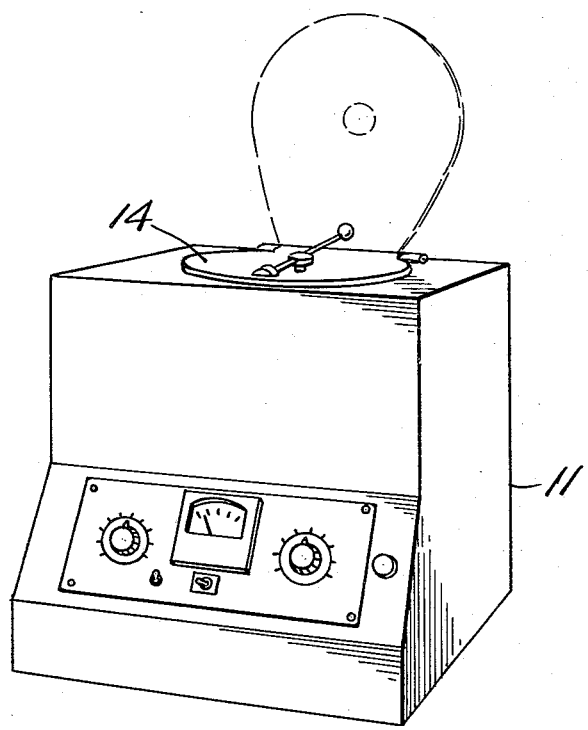
FIG-1-
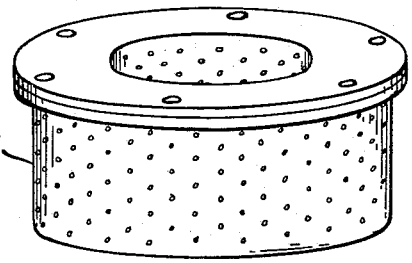
FIG-3-
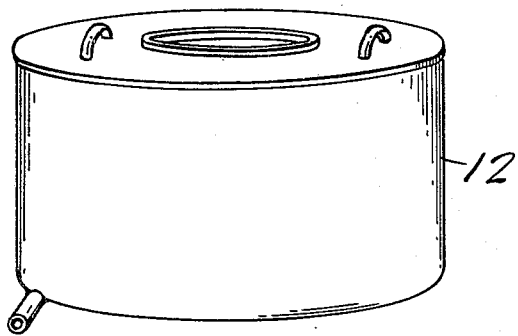
FIG-2-
INVENTORS:
A. W. BROWN,
J. H. GIBBUD.
BY
Staelin & Overman
ATTYS.

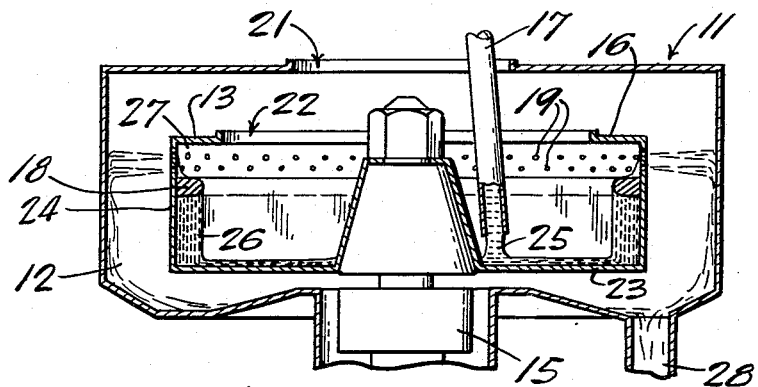
FIG-4-
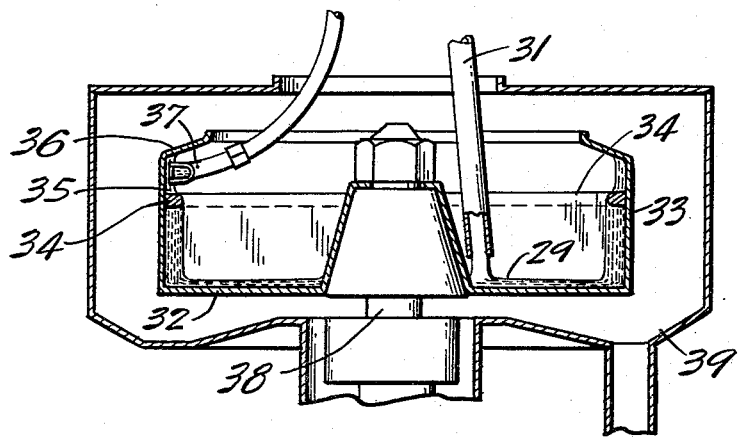
FIG-5-
INVENTORS:
A. W. BROWN,
J. H. GIBBUD.
BY
ATTYS.

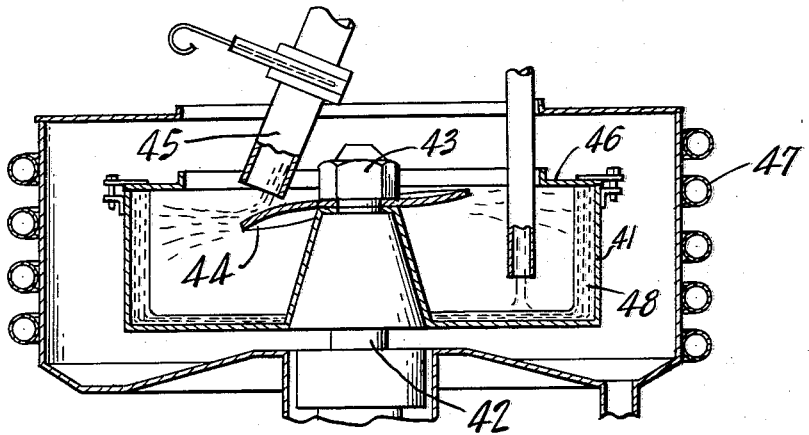
FIG-6-
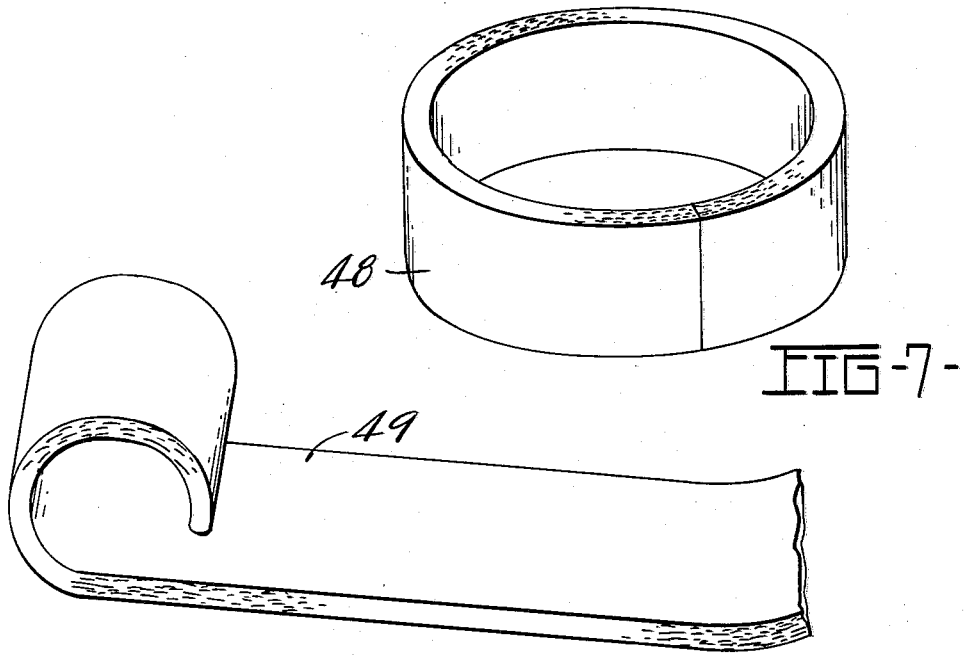
FIG-7-
FIG-8-

July 25, 1961  A. W. BROWN ET AL  2,993,235
METHOD FOR MAKING REINFORCED RESIN PRODUCTS
Filed March 4, 1957  4 Sheets-Sheet 4
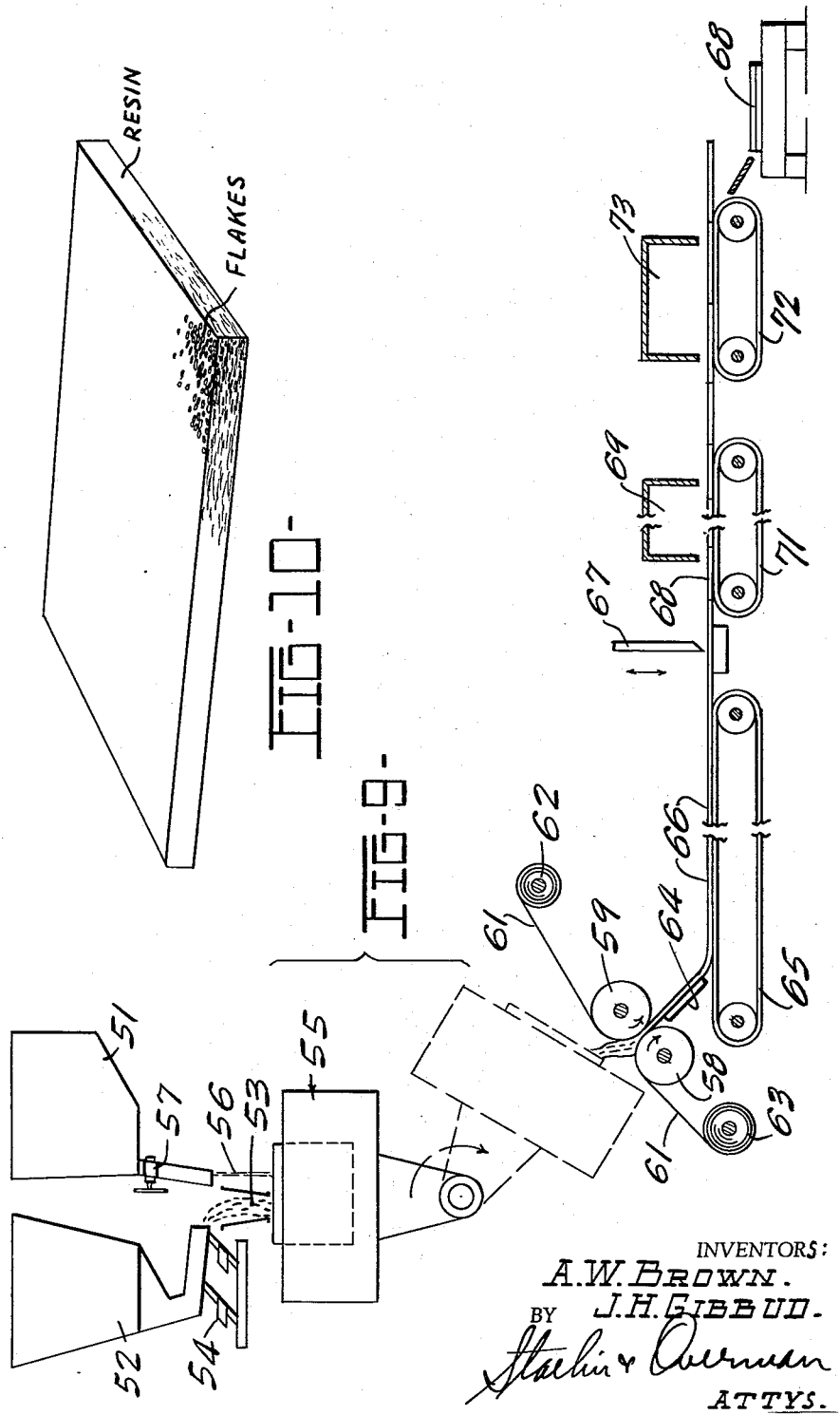
INVENTORS:
A. W. BROWN.
J. H. GIBBUD.
BY
ATTYS.

United States Patent Office 2,993,235
Patented July 25, 1961

2,993,235
METHOD FOR MAKING REINFORCED RESIN PRODUCTS
Alfred Winsor Brown, Ridgewood, N.J., and John H. Gibbud, North Providence, R.I., assignors to Owens-Corning Fiberglas Corporation, Toledo, Ohio, a corporation of Delaware
Filed Mar. 4, 1957, Ser. No. 643,791
5 Claims. (Cl. 18—58.3)

This invention relates to a method of making reinforced resin products and particularly to resinous materials reinforced with glass in fiber, flake, powder or other particulate form.

Resin products are gaining wide acceptance in present-day markets due to their economic advantage and their excellent physical properties. Further improvement in strength properties are realized when resinous materials are reinforced with such materials as fibrous glass. Numerous articles have been reinforced with fibers, the better-known products being fishing rods, furniture, automobile bodies and the like. Particulate glass in the form of powder, flakes, strand, fibers, or hammermilled or chopped fibers has been found to be especially adapted for reinforcing resinous material. Some of these forms of glass not only act as reinforcement for the resin but exhibit dual functions with added properties being realized. Glass and resin combinations have been used in articles where strength and durability were necessary.

It is an object of this invention to provide an improved method of making forms of resin and glass combinations.

It is a further object to provide a method of combining such materials without the inclusion of air or other gases in the final product.

It is also an object to provide a method for intimately mixing particulate glass with other material such as thermosetting and thermoplastic resins.

It is an object to mix fibers or particulate matter with a liquid in a manner to wet out completely the fibers or other particulate material with the liquid.

It is an object to mix particulate glass with a resin so that each surface of the glass is thoroughly wetted.

It is an object to provide a method for making mixtures of flake and resin which are predominantly flake.

Further objects will be apparent from the description which follows.

It has been discovered that centrifugal forces can be used to assure complete wetting of glass surfaces during the mixing of flake, fiber, powder, or particulate forms with a liquid. A liquid material such as a heated thermoplastic resin, a monomeric resin, an uncured thermosetting resin or the like is retained in the form of a film or bath and the particles to be wetted are directed through the liquid utilizing centrifugal forces exerted upon the particles.

The invention will be better understood by reference to the drawings wherein:

FIGURE 1 is a perspective view of a centrifugal mixer;
FIGURE 2 is a perspective view of a drain chamber which is a part of the centrifugal mixing device;
FIGURE 3 is a perspective view of a basket adapted for use with the drain chamber of FIGURE 2;
FIGURE 4 is a view partly in section of a centrifugal mixer;
FIGURE 5 is another sectional view showing a second embodiment of the mixing apparatus;
FIGURE 6 is still another form of the mixing apparatus;
FIGURE 7 is a perspective view of an intermediate product formed with the mixing apparatus;
FIGURE 8 is a perspective view of the intermediate product after being slit and rolled out into sheet form;
FIGURE 9 is a view of a continuous line for producing products of the invention; and
FIGURE 10 is an enlarged view of a flake reinforced resin panel.

In FIGURE 1 is shown a centrifugal mixing device 11 which includes controls for starting and stopping the apparatus and for controlling the speed of rotation. In this centrifugal mixing device, a drain chamber 12 and a basket 13 are located under door 14. The working relationship of the drain chamber and basket is better shown in FIGURES 4, 5 and 6.

In FIGURE 4 is shown one embodiment of the invention comprising a stationary drain chamber 12 within which is disposed a rotatable basket 13 mounted upon shaft 15 which is motor driven. Basket 13 is a generally cylindrical member having a top flange 16 which includes a large opening through which resin inlet pipe 17 is inserted for the introduction of resin into the basket. Basket 13 is provided with an internal flange 18 which acts as a fence as will be described. The vertical side wall of the basket is provided with a plurality of small holes 19, 19 above internal flange 18.

In using the apparatus shown in FIGURE 4, resin 25 or other liquid material is introduced into basket 13 through resin inlet pipe 17. The resin 25 flows outwardly over the bottom 23 of the basket to form a layer of resin 26 below internal flange 18. Particles of glass such as flakes are then added to the basket through opening 21 in the drain chamber and opening 22 in the basket. The particles fall to the bottom 23 of the basket and are flung outwardly whereupon they come in contact with the layer of resin 26. Due to the greater density of the particles, they pass through the liquid layer displacing the liquid. As this is done, resin flows upwardly over internal flange 18 into that area designated by numeral 27. The resin or liquid so displaced then passes outwardly through holes 19, 19 and collects in the drain chamber. The liquid so collected is removed through outlet 28. The desired mixture of liquid and glass particles is controllably maintained. The mixture is scooped from the mixing device, scraped and shaken from the up-ended device.

In FIGURE 5 is shown another embodiment of the invention. When operating this apparatus, liquid material 29 is introduced through tube 31. The liquid after coming in contact with the bottom 32 of basket 33 flows outwardly to form a layer of liquid on the inner wall of the basket below internal flange 34. Particles which are to be mixed with the liquid are then introduced into basket 33 and they are flung outwardly into the liquid layer below internal flange 34 within basket 33. As liquid material is displaced by the higher density particles which have been added, some of the liquid moves upward over the internal flange 34 to form a liquid layer 35 within the basket above the internal flange 34. Liquid layer 35 remains in the basket because of the conical-shaped flange 36 and the internal flange. The liquid layer is pressed against the wall of the basket where it is held due to the forces set up by rotation of the basket. A scoop 37 is introduced into the liquid layer 35 to remove the liquid through the hollow scoop and tube attached thereto. Basket 33 rotates upon shaft 38 which is driven by a suitable motor means. The rotatable basket is mounted within a drain chamber 39 or housing which retains any material that is thrown from the basket as it is rotated. The liquid and particle mixture is scooped out of the mixer or scraped and shaken out of the up-ended device.

In FIGURE 6 is shown still another embodiment of apparatus used in carrying out the invention. This apparatus includes a rotatable basket 41 mounted upon shaft 42 which is motor driven. Mounted upon shaft 42 and retained by nut 43 is a deflector disc 44. In operating this apparatus a liquid such as a suitable resin is introduced into the basket 41 and due to the rotation of the basket, the resin forms a wall of resin on the inner side of the basket as shown. Particulate glass such as flakes of glass are added to the basket from flake tube 45 and as the flakes strike the deflector disc 44, they are thrown outwardly in a pattern which covers the entire height of the resin layer within the basket. The deflector disc comprises simply a sheet metal disc which is bent upwardly on one side and downwardly on the opposite side to form a propeller-like member. Other deflecting means can be used. For instance, plastic or paper elements having the proper configurations are operable. The flakes added to basket 41 and distributed by deflector disc 44 pass through the liquid layer within the basket and are intimately mixed with the liquid layer, all surfaces of the flakes being wetted by the liquid. As a part of the intimate mixing process, all entrapped air upon the surfaces of the flakes is removed. The presence of entrapped air results in a reduction of strength and light transmission. Mixing by any other means results in entrapped air which reduces light transmission by about 35%. Metered portions of resin and particulate material are added so that the final mixture within the basket comprises the proper ratio of flake or particulate material and liquid. Basket 41 is preferably provided with a removable upper flange 46. After the proper mixture is obtained, this flange is removed so that the mass of particulate material and liquid can be removed from the basket with greater ease. The drain chamber is provided with coils 47 through which either a heating or cooling fluid can be flowed for controlling the temperature of the material within basket 41.

Depending upon the materials being used, the mixture of liquid and particulate materials may be either cooled or heated to set the mixture at least temporarily so that the layer within the basket can be removed after the upper flange 46 has been removed. This ring of material will appear as shown in FIGURE 7. The ring of material 48 is slit and rolled out into sheet form as shown in FIGURE 8. This sheet of material 49 will comprise oriented particles if flakes are used as the particulate material added to the resin or other liquid within the basket. If flakes of glass are added to the basket, they orient themselves so that each of the flakes is generally parallel to the vertical wall of the basket. Then when the ring of material is removed, split and laid out into a sheet, the flakes remain oriented so that their major faces are generally parallel with the major faces of the sheet itself. Actually when the flakes are wetted by the resin, the flakes completely disappear although they remain present as shown. Any source of heat may be used for controlling the temperature of the mix within the basket. For instance, electrical heating strips may be used instead of the coils shown. When a resin is used as the liquid, it is desirable when making a pipe to cure the resin within the basket. Sections of pipe can thereby be made by curing the mixture and then removing the ring of material from the basket. When thermoplastic materials are used as the liquid material, heat is applied during the mixing operation so that the thermoplastic material remains liquid in the basket. A mixture of liquid thermoplastic material and particulate material can then be removed and handled as desired or the heat may be removed from the basket and after the thermoplastic material sets into a solid form, the reinforced thermoplastic ring of material is removed from the mixing device. In this latter instance, the mixing device also acts as a forming device. The reinforced thermoplastic material may be diced and used as an injection molding material.

In FIGURE 9 is shown apparatus for continuously producing reinforced resin panels or the like. When producing sheets of reinforced material such as structural panels or panels suitable for lighting fixtures, apparatus such as that shown in FIGURE 9 can be used. A hopper 51 which includes the liquid material is positioned adjacent to hopper 52 containing the particulate material 53. Hopper 52 is provided with a vibrator 54 which meters the particulate material into centrifugal mixer 55. The flow of liquid 56 from hopper 51 is controlled by valve 57. After mixing of the particulate material and liquid is complete, the centrifugal mixing device 55 is rotated so that the mixture is removed and directed onto rolls 58 and 59. An alternative consists in the use of a bottom unloading centrifugal mixer from which the mixture can be scooped into a hopper disposed below the mixer so that rotation or tipping of the mixer is unnecessary. After the centrifugal mixer 55 is tipped into the unloading position, a suitable scraping device is used if necessary to remove the mixture. A suitable film 61 is paid off of rolls 62 and 63 so that a film is positioned on either side of the mixture retained at the bite of rolls 58 and 59. The film is either a material such as cellophane or a suitable aluminum or other metal foil. Paper or any of various other materials may be used depending upon the temperatures involved in subsequent steps in the process. Rolls 58 and 59 form a sheet of the desired thickness of the mixture coming from centrifugal mixer 55. When the particulate matter is in the form of platelets or flakes, rolls 58 and 59 also tend to align the particulate matter within the sheet being formed.

The sheet formed by rolls 58, 59 passes over the retaining plate 64 and is deposited upon conveyor belt 65. The sheet material 66 advances on conveyor belt 65 and passes under cutter 67. The blade of the cutter bearing upon the block below the sheet material chops the sheet into any desired length. The sheets 68 are advanced into heating zone 69 by conveyor belt 71. In the heating zone the liquid material is cured or set. If a thermosetting material is used, the resin polymerizes while the sheet is in the heating zone 69.

The material after leaving heating zone 69 progresses forward to conveyor 72 which introduces the sheets into a post-heating zone 73. The sheets of material 68 come off of the end of the line and are stacked as indicated.

When utilizing a thermosetting resin such as a polyester resin, the catalyst and resin are mixed and placed in hopper 51. If desired, the catalyst is added to the resin coming from hopper 51 by a suitable mixing device. Particulate matter such as glass flake may be used with such a resin and when used, it is directed into the centrifugal mixer 55 by the vibrator attachment on hopper 52.

The mixing process of this invention makes it possible to provide complete wetting of the surfaces of particulate glass without the need for violently disturbing or working the particulate glass itself. This is a decided advantage over other mixing methods. There are no contacts between propellers and the particulate glass which would result in the breaking up of the particles. Instead, the particles are forced through the liquid in a positive manner which assures complete wetting of all of the surfaces of the particles by the liquid and removal of all entrapped air. This process furthermore makes it possible to provide uniform mixtures of particles and liquid, which mixtures are very high in particle content. Mixtures comprising 90% by weight glass or higher can be provided using these methods. It is virtually impossible to stir into a liquid more than 10% or 15% by weight of fibrous glass or glass in other forms such as flake. The particles when added to the liquid and stirred by the usual methods result in balling of the mixture and insufficient mixing. Great forces are exerted in this mixing apparatus without any damage resulting to the materials being mixed. The centrifugal forces involved by spinning the basket at high speeds are much greater than can be applied by other means. This process is not only good for mixing particles of glass with a liquid but can be used wherever it is desirable to form mixtures of a solid with a liquid wherein the solid content is to be high. Complete and rapid mixing results by the use of the processes here disclosed.

If it is desirable to wet a mass of particles such as powder, fibers, flakes or a porous layer of a solid such as a sintered or partially sintered particulate mass, then the principles of the invention are utilized to effect complete mixing of the mass of particles and the liquid by spinning the mass of particles on a restraining surface and then introducing the liquid onto the mass of particles so that the liquid passes through the mass due to centrifugal forces imposed upon the liquid. If the liquid has a specific gravity greater than that of the particles, then finely divided particles are displaced by the liquid and thereby intimately mixed. In the case of a sintered mass retained upon a rotating surface which imparts its rotation to the sintered mass and to a liquid introduced onto the sintered mass, the liquid will pass through the porous sintered mass due to its fluidity regardless of whether the density of the fluid is greater than that of the sintered mass or not.

Various modifications may be made within the spirit and scope of the following claims.

We claim:

1. Process of forming a molded part of bonded glass flakes comprising introducing a liquid resin into a basket, rotating the basket to form and retain an upstanding, centrifugally formed wall of resin in the basket, introducing glass flake into the basket, interrupting the advancement of the glass flake with a rotating deflecting surface within the basket thereby distributing the glass flake throughout the extent of the centrifugally formed wall of resin, continuing rotation of the basket to displace the resin in the wall of resin with glass flakes, and setting the resin before stopping rotation of the basket to form a resin bonded glass flake molding.

2. Process of forming a bonded flake glass structure comprising introducing a liquid binder into a basket mold, spinning the mold to form and retain an upstanding wall of liquid within the mold, advancing sufficient glass flake into the basket mold to produce a 90% glass structure, interrupting the advancement of said glass flake by introducing the flake onto a rotating, deflecting surface within the mold to distribute the flake evenly into the retained liquid binder within the mold, continuing the spinning of the mold to effect complete wetting of the glass surfaces with the liquid binder and displacement of resin with flake, and setting the liquid binder to form a bonded glass flake structure.

3. Process of mixing glass flakes having major faces greater in width than the flake thickness with a liquid resin in a manner to wet completely all of the glass surfaces comprising introducing a liquid resin into a basket, rotating the basket to form and retain an upstanding, centrifugally formed wall of resin at the periphery of the basket, advancing glass flake into the basket, interrupting the advancement of the glass flake with a rotating deflecting surface within the basket thereby distributing the glass flake throughout the extent of the centrifugally formed wall of resin, continuing rotation of the basket to displace the resin in the wall of resin with glass flakes and thereby remove all air from the surfaces of the glass and to align the flakes so that their major faces lie substantially tangential to the periphery of the basket, removing the displaced resin from the basket while retaining the glass flakes and remaining resin within the basket, and removing the glass flake and resin mixture from the basket.

4. Process of mixing glass flakes greater in width than thickness with a resin comprising introducing a liquid resin into a rotatable basket, rotating the basket to sling the liquid resin outwardly and to form a wall of liquid resin retained on the inner side of the periphery of the basket, advancing glass flakes into the rotating basket, interrupting the advancement of the glass flakes with a rotating deflecting surface to distribute uniformly the glass flake throughout the wall of liquid resin, and continuing rotation of the basket for sufficient time to cause the glass flakes to displace liquid resin in the wall of resin and to align the glass flakes with respect to one another and with respect to the periphery of the basket, the glass flakes being oriented with their greater dimension substantially parallel to the periphery of the basket thereby removing all air from the surfaces of the glass flakes, removing the displaced resin from the basket, and removing the glass flake and liquid resin mixture from the basket.

5. Process of mixing flake glass and a liquid resin in desired proportions comprising introducing the liquid resin into a rotatable basket, rotating the basket to sling the liquid resin outwardly to the periphery of the basket, retaining the liquid resin as a centrifugally formed wall of liquid within a completely filled zone of the rotating basket, introducing a portion of glass flake into the basket and then into the wall of liquid resin to displace liquid resin and thereby remove a controlled portion of the liquid resin from the resin filled zone by causing the resin to overflow while retaining the flake glass and remaining resin within the completely filled zone, and removing the flake glass and resin mixture from the basket.

References Cited in the file of this patent

UNITED STATES PATENTS

| 814,720 | Monroe | Mar. 13, 1906 |
| 1,947,487 | Newhouse | Feb. 20, 1934 |
| 2,265,226 | Clewell | Dec. 9, 1941 |
| 2,285,370 | Staelin | June 2, 1942 |
| 2,346,784 | Pollack | Apr. 18, 1944 |
| 2,671,932 | Pique | Mar. 16, 1954 |
| 2,695,256 | De Olloqui et al. | Nov. 23, 1954 |
| 2,739,917 | Schulze | Mar. 27, 1956 |
| 2,785,442 | Boggs | Mar. 19, 1957 |

FOREIGN PATENTS

| 688,113 | Great Britain | Feb. 25, 1953 |